Patented Oct. 20, 1931

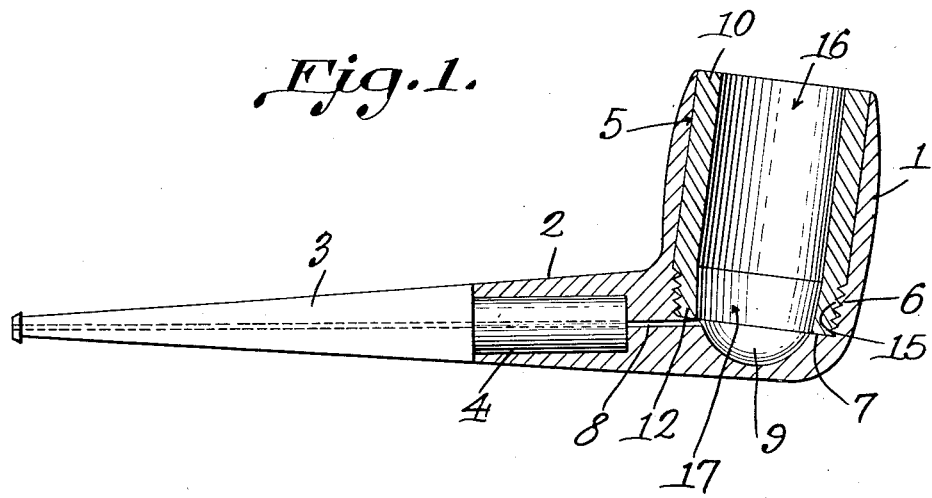
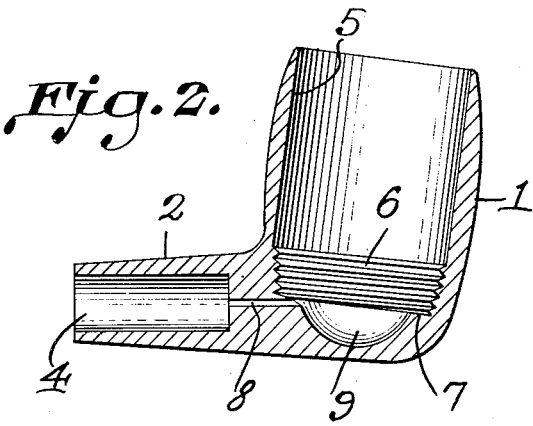
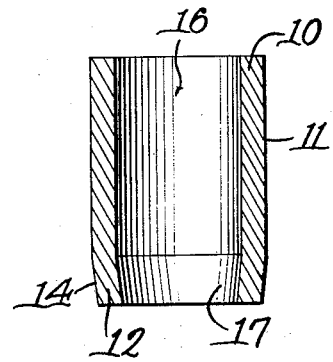

1,828,149

UNITED STATES PATENT OFFICE

HUGH MALLETT, OF BRADFORD, ILLINOIS

PIPE

Application filed March 13, 1931. Serial No. 522,352.

This invention aims to provide a pipe having novel means for carrying, removably, a tubular bowl insert, made of corn cob or the like.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in longitudinal section, a device constructed in accordance with the invention, the mouth piece being in elevation;

Figure 2 is a longitudinal section of the bowl and the stem, the mouth piece and the insert having been removed;

Figure 3 is a longitudinal section of the insert.

The pipe forming the subject matter of this application may be made of any desired material, and may be of any preferred shape, but, by way of illustration, the pipe has been shown as comprising a bowl 1 carrying a stem 2, the bowl and the stem being made of aluminum, if desired. A mouth piece 3 is detachably connected at 4, in any preferred manner, with the stem 2.

The bowl 1 is provided with a cylindrical chamber 5, including an inwardly tapered, threaded, lower portion 6. Below the tapered portion 6 of the chamber 5, the bowl 1 is equipped with a transverse shoulder 7. The bore 8 of the stem 2 opens into the bowl 1 below the shoulder 7. At the bottom of the bowl 1, below the bore 8, there is a depression 9 forming a receptacle for ashes and liquid that may accumulate in the pipe.

The numeral 10 marks a tubular bowl insert, which may be made of various materials. It is preferred, however, that the insert 10 be fashioned from corn cob, because the virtues of corn cob, as a tobacco pipe material, are well known and recognized by smokers. The insert has an external cylindrical surface 11, throughout most of its length, so that the insert can be rotated readily in the bowl 1. The insert 10 has a tapered lower end 12 adapted to fit snugly in the inwardly tapered, threaded portion 6 of the chamber 5 in the bowl 1. Referring to Figure 3, it will be noted that the tapered lower end 12 of the insert 10 is smooth, there being no threads upon it, as the insert comes from the manufacturer. When, however, the insert 10 is placed in the bowl 1 and rotated, the threads 6 of the bowl will cut threads 15 on the smooth surface 14 of the insert, the insert, thus, being held securely in the bowl. The insert 10 is turned until the lower end of the insert has a firm engagement with the shoulder 7, and therefore, the threads 6 of the bowl will be kept clean and ready to receive a new insert. If the insert 10 happens to be shrunk a little, it may be crowded down against the shoulder 7, nevertheless, to make a tight fit. Since the threads 6 of the bowl 1 cut the threads 15 in the insert 10, the bowl 1 should be made of such material that it will carry threads of considerable strength, and it is on that account that aluminum is suggested as the proper material to be used in the making of the bowl 1. The opening 16 of the insert 10 may be shaped as desired. It may be cylindrical in its upper portion, and tapered in its lower portion, as shown at 17.

The device forming the subject matter of this application affords all of the well known advantages of a corn cob pipe, and at the same time affords a pipe which is more sightly in appearance than an ordinary corn cob pipe.

Having thus described the invention, what is claimed is:

1. A pipe comprising a bowl provided with a chamber having internal threads, and a removable insert in the bowl, the insert being externally smooth and being of softer material than the bowl, whereby the threads of the bowl will cut coacting threads in the insert and hold the insert in the bowl.

2. A pipe comprising a bowl provided with a chamber having a tapered lower portion which is provided with internal threads, and a removable insert in the bowl, the insert having a tapered lower end, the insert being externally smooth and being of softer material than the bowl, whereby the threads of the bowl will cut coacting threads in the insert and thereby hold the insert in the bowl.

In testimony that I claim the foregoing as my own, I have hereto affixed my signature.

HUGH MALLETT.